(12) United States Patent
Paris

(10) Patent No.: US 6,600,848 B2
(45) Date of Patent: Jul. 29, 2003

(54) INTEGRATED THERMO-OPTICAL SILICA SWITCH

(75) Inventor: Bertrand Paris, Thomery (FR)

(73) Assignee: Corning Incorporated, Corning, NY (US)

( * ) Notice: Subject to any disclaimer, the term of this patent is extended or adjusted under 35 U.S.C. 154(b) by 221 days.

(21) Appl. No.: 09/916,952

(22) Filed: Jul. 27, 2001

(65) Prior Publication Data
US 2002/0021858 A1 Feb. 21, 2002

(30) Foreign Application Priority Data

Aug. 2, 2000 (EP) ............................................ 00402203

(51) Int. Cl.[7] .............................. G02B 6/26; G02B 6/42
(52) U.S. Cl. ............................... 385/16; 385/14; 385/40
(58) Field of Search ............................ 385/14, 16, 40, 385/41, 132

(56) References Cited

U.S. PATENT DOCUMENTS

| 5,970,186 | A | * | 10/1999 | Kenney et al. ............... 385/16 |
| 6,084,050 | A | * | 7/2000 | Ooba et al. .................... 528/42 |
| 6,163,633 | A | * | 12/2000 | Ueda ............................ 385/16 |
| 6,181,456 | B1 | * | 1/2001 | McBrien et al. ............. 359/245 |
| 6,215,918 | B1 | * | 4/2001 | Keil et al. ...................... 385/16 |
| 6,229,949 | B1 | * | 5/2001 | Ido et al. ...................... 385/145 |
| 6,233,377 | B1 | * | 5/2001 | Keil et al. ...................... 385/16 |
| 6,246,809 | B1 | * | 6/2001 | Jouanno et al. ................ 385/22 |
| 6,321,011 | B2 | * | 11/2001 | Deacon ........................ 385/50 |
| 6,351,578 | B1 | * | 2/2002 | Brinkman et al. ............. 385/16 |
| 6,353,694 | B1 | * | 3/2002 | Paiam .......................... 385/39 |

FOREIGN PATENT DOCUMENTS

| EP | 1 018 665 A1 | 12/2000 | ............ G02F/1/313 |
| JP | 61056329 | 3/1986 | ............ G02F/1/31 |
| JP | 05080360 | 2/1993 | ............ G02F/1/313 |

* cited by examiner

Primary Examiner—Brian Healy
Assistant Examiner—Kevin S Wood
(74) Attorney, Agent, or Firm—Juliana Agon; Gregory A. Stobbs; Harness, Dickey & Pierce

(57) ABSTRACT

An optical switch is provided. The optical switch includes a substrate having a first surface and a second surface. At least one optical waveguide is formed below the first surface of the substrate. A heating element is disposed on the first surface of the substrate. The heating element is also disposed in proximity to the at least one optical waveguide. A cavity is formed in the second surface of the substrate. The cavity is also disposed in the proximity to the at least one optical waveguide. A heat conductive material is disposed within the cavity.

12 Claims, 3 Drawing Sheets

INTEGRATED THERMO-OPTICAL SILICA SWITCH

CROSS REFERENCE TO RELATED APPLICATION

This application claims the benefit of European Application No. 00402203.4, filed Aug. 2, 2000.

BACKGROUND OF THE INVENTION

1. Field of the Invention

The present invention relates generally to a switching device for an optical communication system. More particularly, the present invention is directed to a thermo-optical switch which can be integrated into a semi-conductor substrate.

2. Technical Background

As optical communication systems evolve, there is a growing demand for optical switching devices. Integrated optical switching devices are optical components commonly used for building optical communication networks. In order to realize an integrated optical switching device, several scientific principles and mechanisms may be used. One such principle is the thermo-optic effect. When this principle is applied to silica waveguides, the design of the device is usually based on a Mach-Zehnder interferometer. The power response of the device is obtained by creating a path difference between the two optical waveguides of the interferometer. This path difference is obtained by controlling the temperature difference between the two waveguides by way of metallic heaters. Thus, the switch speed of the device depends on the kinetics of the thermal variation between the two waveguides.

Integrated optical switch devices are currently manufactured on a silicon substrate, instead of silica, in order to obtain a high switch speed due to the better diffusion of the heat in the silicon. One or more silica glass waveguides are then formed on a surface of the silicon substrate. The silica glass waveguide and the silicon substrate have different coefficient of thermal expansion (CTE). This leads to stresses within the device including polarization dependence. Moreover, it creates a warpage of the silicon wafer, generating concerns in both the photolithographic and the pigtailing processes.

Accordingly, it is desirable to provide a technique for manufacturing integrated optical switch devices having a higher switching speed by building these switching devices on a silica substrate. It is also desirable to provide an optical switch having integrated features which overcome the problems with optical switches manufactured on other types of substrates.

SUMMARY OF THE INVENTION

In accordance with the teachings of the present invention, an optical switch is disclosed. The optical switch includes a substrate having a first surface and a second surface. At least one optical waveguide is formed below the first surface of the substrate. A heating element is disposed on the first surface of the substrate. The heating element is also disposed in proximity to the at least one optical waveguide. A cavity is formed in the second surface of the substrate. The cavity is also disposed in proximity to the at least one optical waveguide. A heat conductive material is disposed within the cavity.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various features and embodiments of the invention, and together with the description serve to explain the principles and operation of the invention.

BRIEF DESCRIPTION OF THE DRAWINGS

The various advantages of the present invention will become apparent to one skilled in the art by reading the following specification and appended claims, and by referencing the following drawings in which:

DETAILED DESCRIPTION OF THE PREFERRED EMBODIMENTS

Figure 1:
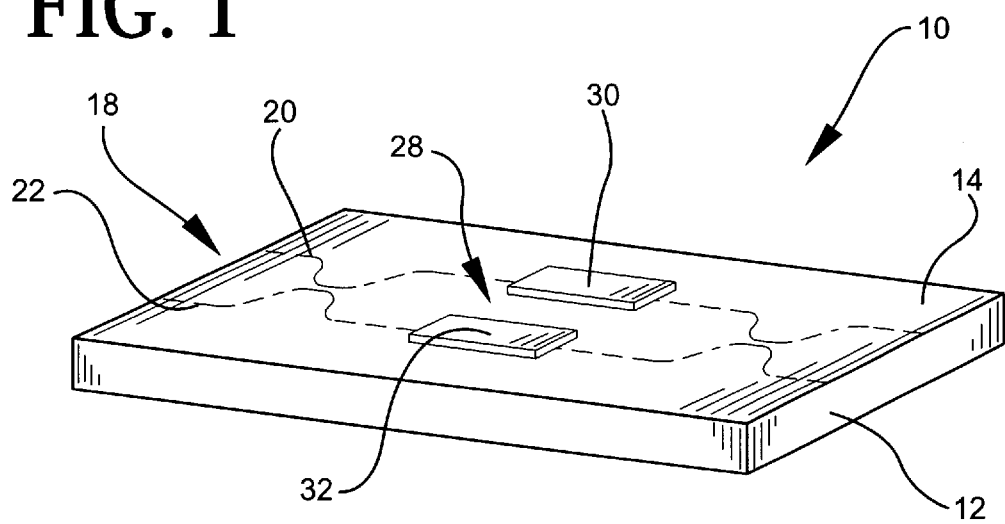
FIG. 1 is a perspective view of the thermo-optical switch in accordance with a preferred embodiment of the present invention.

Referring now to FIG. 1, the integrated thermo-optical silica switch 10 is shown in accordance with a preferred embodiment of the present invention. More specifically, the switch 10 is formed on a silica substrate 12 having a first or top surface 14 and a second or bottom surface 16. One or more waveguides 18 are formed on the first surface 14 of the substrate 12. As shown, the waveguides 18 include a first optical waveguide 20 and a second optical waveguide 22. One or more heating elements 28 are then formed along the top surface 14. The heating elements 28 are preferably a layer of metallic foil applied to the surface of the substrate 12, and generate heat when an electric current from an external source is applied through the heating elements 28. As specifically shown, a first heating element 30 is disposed directly above a predetermined portion of the first waveguide 20, and a second heating element 32 is disposed above a predetermined portion of the second waveguide 22.

Figure 2:
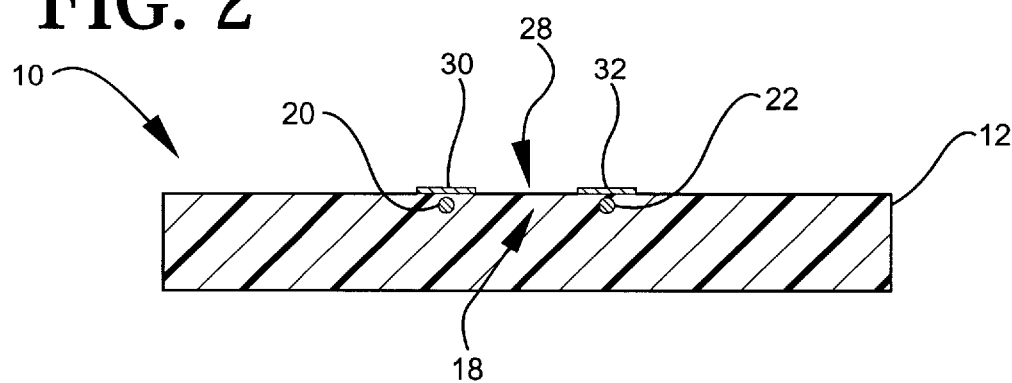
FIG. 2 is a sectional view of the thermo-optical switch of the present invention.
Figure 3:
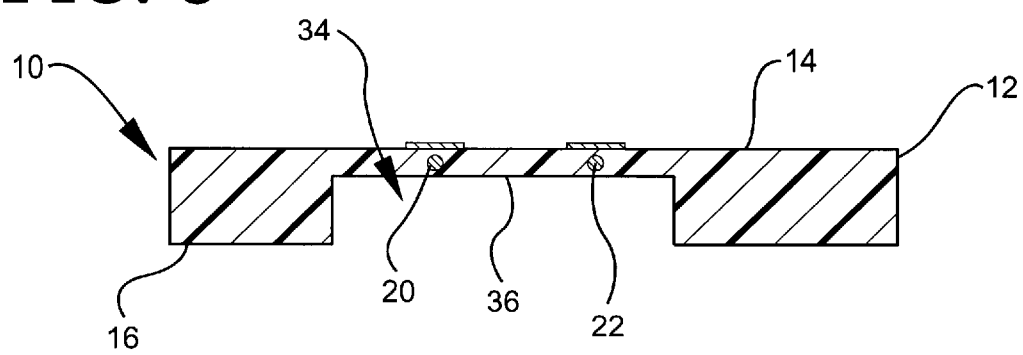
FIG. 3 is a cross sectional view of the thermo-optical switch of FIG. 2 showing the groove or cavity formed in the substrate.

A cross sectional view of the integrated thermo-optical switch 10 is shown in FIG. 2. More specifically, FIG. 2 discloses the proximity of the heating elements 30 with respect to the optical waveguides 18 and discloses the state of switch 10 prior to subsequent processing steps. FIG. 3 shows the switch 10 after a cavity or groove 34 is formed into the second surface 16 of the silica substrate 12. Preferably, a substantial portion of material is removed from the substrate 12 so that the interface surface 36 of the groove 34 also lies in close proximity to the optical waveguides 18. The groove or cavity 34 is preferably formed by way of a variety of machining processes including but not limited to ultrasonic impact grinding, excimer etching, and mechanical grinding. In order to fully exploit the advantages of the silica substrate 12, it is desirable to reduce the thickness of the silica substrate 12 in an area directly below the optical waveguides 18. This area is also referred to as the heated area, which controls the optical response of the silica switch 10.

Figure 4:
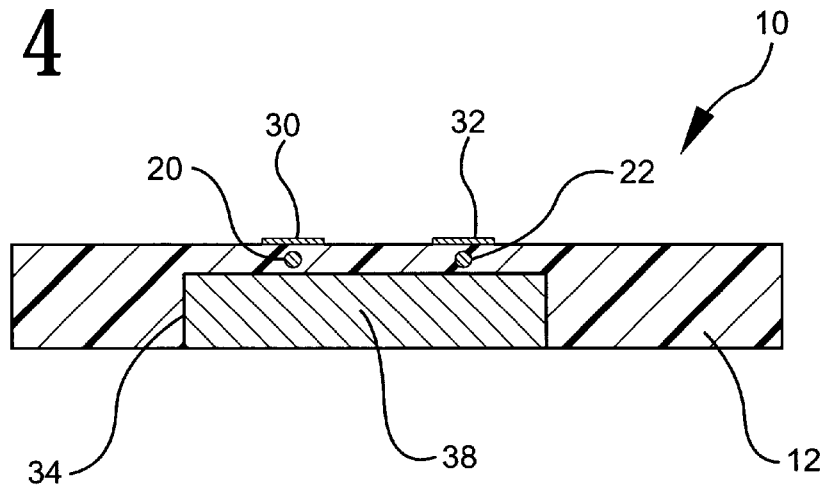
FIG. 4 is a cross sectional view of the thermo-optical switch of FIGS. 2 and 3 showing the grove filled with a heat conductive material.

As shown in FIG. 4, the groove or cavity 34 is subsequently filled with a conductive material 38, including but not limited to, copper or silicon, for increasing the thermal diffusion below the heated area, which in turn increases the switching speed of silica switch 10.

Figure 5:
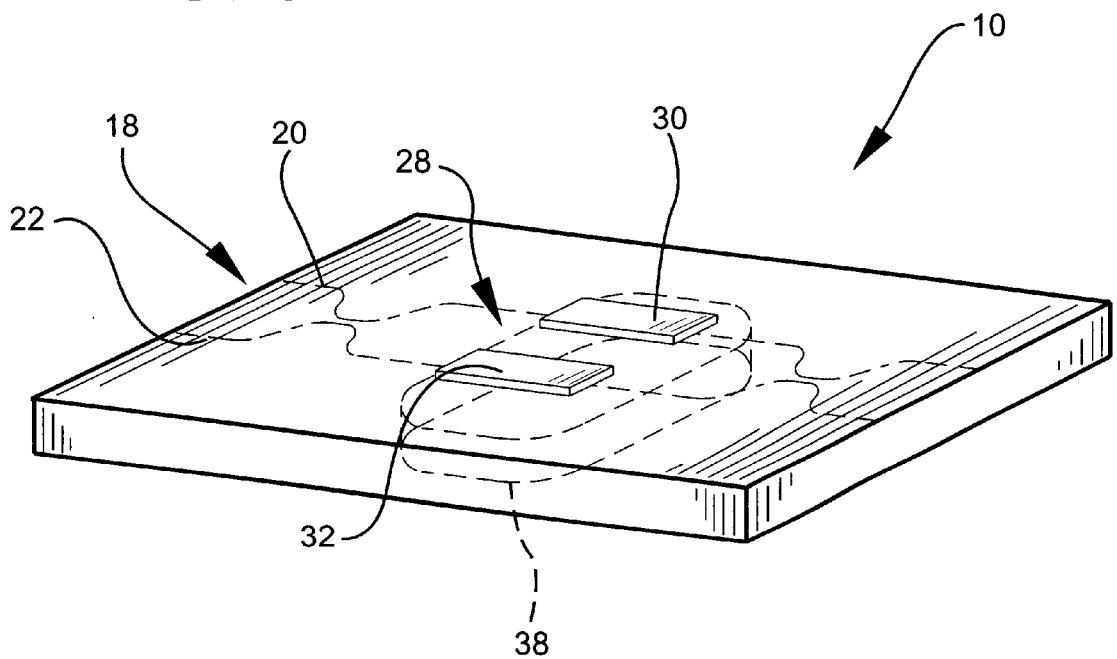
FIG. 5 is a perspective view of the thermo-optical switch showing the location of the cavity formed below the heated area of the substrate.

FIG. 5 discloses the completed device forming the integrated thermo-optical switch 10. As shown, the optical waveguides 18 are disposed between the foil heating elements 28 and the conductive material 38. As a result, a high speed thermo-optical switch can be obtained using a silica substrate 12, due to the high thermal diffusion of the substrate 12 below the foil heating elements 28.

Figure 6:
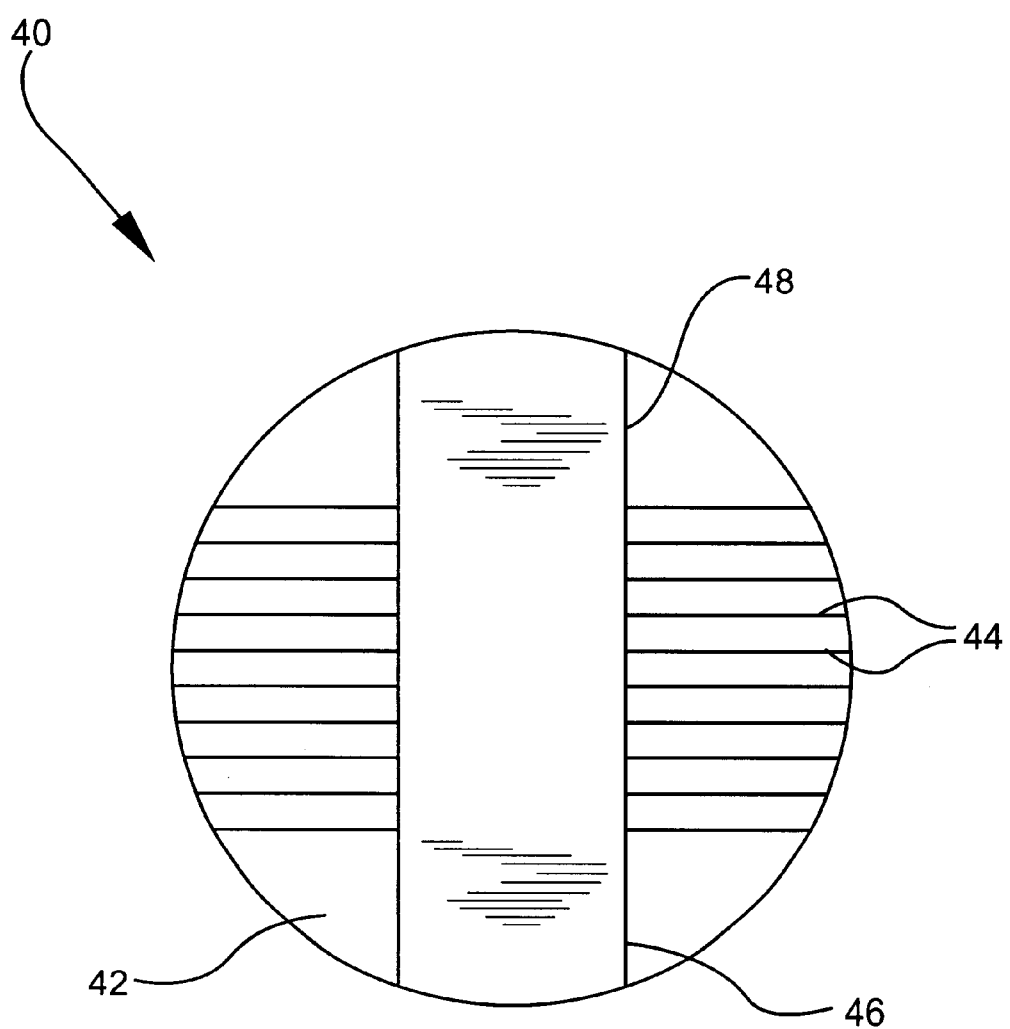
FIG. 6 is a plan view of a silica substrate having a plurality of switches formed thereon in accordance with the teachings of the present invention.

Turning now to FIG. 6, another preferred embodiment of the integrated thermo-optical silica switch 40 is shown in accordance with the present invention. As shown, switch 40 is also formed on a silica wafer 42 and has a plurality of optical waveguides 44 formed thereon. While not specifically shown, the optical waveguides 44 can take on a variety of configurations, and a plurality of foil heating elements are disposed over the optical waveguides 44. The silica switch 40 also includes a groove or cavity 46 which is filled with a heat conductive material 48. As will be appreciated, switch 40 allows a series of switches to be manufactured onto a single integrated device.

In operation, the conductive material 38, 48 functions as a passive component for the integrated thermo-optical silica switch 10. The primary function of the conductive material is to significantly enhance the transfer of heat from the optical waveguides 18 and the substrate 12 when the heating elements 28 are in an off or non-heating state. The active function of the switch 10 is implemented by preferably applying an electrical current through the foil heating elements 28 for switching the optical signals between the first and second optical waveguides 20, 22.

The foregoing discussion discloses and describes exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. An optical switch comprising:
    a substrate having a first surface and a second surface;
    at least one optical waveguide formed below the first surface of the substrate;
    a heating element disposed on the first surface of the substrate, the heating element being disposed in proximity to the at least one optical waveguide;
    a cavity formed in the second surface of the substrate, the cavity being disposed in proximity to the at least one optical waveguide; and
    a heat conductive material disposed within the cavity.

2. The optical switch of claim 1 wherein the at least one optical waveguide is disposed between the heating element and the conductive material disposed within the cavity.

3. The optical switch of claim 1 wherein the substrate is a silica substrate.

4. The optical switch of claim 1 wherein the heating element is a layer of metallic foil applied to the first surface of the substrate.

5. The optical switch of claim 4 wherein the layer of metallic foil generates heat when an electric current is applied thereto.

6. An integrated thermo-optical switch comprising:
    a silica substrate having a top surface and a bottom surface;
    a pair of optical waveguides formed below the top surface of the substrate;
    a pair of foil heating elements disposed on the top surface of the substrate, the heating elements each being disposed above an associated optical waveguide of the pair of optical waveguides;
    a cavity formed in the bottom surface of the substrate, the cavity being disposed in proximity to the pair of optical waveguides; and
    a heat conductive material disposed within the cavity.

7. The switch of claim 6 wherein the pair of optical waveguides are disposed between the heating elements and the heat conductive material.

8. The switch of claim 7 wherein the heating elements generate heat when an electric current is applied thereto.

9. The switch of claim 6 wherein the heat conductive material is one of copper and silicon.

10. A method for forming an integrated thermo-optical switch comprising the steps of:
    providing a substrate having a first surface and a second surface;
    forming at least one optical waveguide on the first surface of the substrate;
    forming a heating element over a predetermined portion of the optical waveguide;
    forming a cavity in a predetermined location below a portion of the optical waveguide; and
    filling the cavity with a heat conductive material.

11. The method of claim 10 wherein the substrate is a silica substrate.

12. The method of claim 10 wherein the conductive material is one of copper and silicon.

* * * * *